US011200148B2

(12) United States Patent
Booth et al.

(10) Patent No.: US 11,200,148 B2
(45) Date of Patent: Dec. 14, 2021

(54) METHOD AND SYSTEM FOR IDENTIFYING A SOURCE OF A MEMORY LEAK

(71) Applicant: Avigilon Corporation, Vancouver (CA)

(72) Inventors: Daniel James Booth, Vancouver (CA); Shaun P. Marlatt, North Vancouver (CA)

(73) Assignee: AVIGILON CORPORATION, Vancouver (CA)

( * ) Notice: Subject to any disclaimer, the term of this patent is extended or adjusted under 35 U.S.C. 154(b) by 65 days.

(21) Appl. No.: 16/842,049

(22) Filed: Apr. 7, 2020

(65) Prior Publication Data

US 2020/0327040 A1    Oct. 15, 2020

Related U.S. Application Data

(60) Provisional application No. 62/831,519, filed on Apr. 9, 2019.

(51) Int. Cl.
*G06F 11/00*     (2006.01)
*G06F 11/36*     (2006.01)

(52) U.S. Cl.
CPC ...... *G06F 11/3636* (2013.01); *G06F 11/3664* (2013.01)

(58) Field of Classification Search
CPC .................... G06F 11/3636; G06F 11/3664
See application file for complete search history.

(56) References Cited

U.S. PATENT DOCUMENTS

| 8,504,878 | B2 | 8/2013 | Otenko | |
|---|---|---|---|---|
| 9,104,563 | B2 | 8/2015 | Taskov | |
| 9,454,454 | B2 | 9/2016 | Abraham et al. | |
| 9,760,464 | B1* | 9/2017 | Helliwell | G06F 11/073 |
| 2004/0078540 | A1* | 4/2004 | Cirne | G06F 11/348 |
| | | | | 711/170 |
| 2006/0206885 | A1* | 9/2006 | Seidman | G06F 11/076 |
| | | | | 717/148 |
| 2008/0301504 | A1* | 12/2008 | Chen | G06F 11/008 |
| | | | | 714/42 |

(Continued)

OTHER PUBLICATIONS

Microsoft Corporation, "User-Mode Dump Head (UMDH) tool", available at <https://docs.microsoft.com/en-us/windows-hardware/drivers/debugger/umdh> dated May 23, 2017, 1 page.

(Continued)

*Primary Examiner* — Joshua P Lottich
(74) *Attorney, Agent, or Firm* — Perry + Currier, Inc.

(57) ABSTRACT

Methods, systems, and techniques for tracing callstacks, the results of which can be used to identify a source of a memory leak. A memory heap is sampled at different times to determine counts of respective allocations of different allocations at the different times. From the counts of the respective allocations at the different times, rates at which the respective allocations have changed over the different times, and which of the rates is equal to or greater than a leak indication rate, are determined. Callstacks for respective allocations of the different allocation sizes for each of the rates that is equal to or greater than the leak indication rate are traced. The results of the tracing may be used during debugging to identify the source of the memory leak.

18 Claims, 13 Drawing Sheets

(56) References Cited

U.S. PATENT DOCUMENTS

2011/0276949 A1   11/2011  Otenko
2015/0186644 A1    7/2015  Komissar et al.
2016/0070633 A1*  3/2016  Abraham ................ G06F 11/34
                                                     714/47.3
2019/0196939 A1*  6/2019  Lengauer ............ G06F 11/3006

OTHER PUBLICATIONS

C. Armour-Brown et al., "Valgrind," available at <http://http://web.archive.org/web/20190408015018/http://valgrind.org/> dated Apr. 8, 2019, 2 pages.

\* cited by examiner

METHOD AND SYSTEM FOR IDENTIFYING A SOURCE OF A MEMORY LEAK

RELATED U.S. APPLICATION DATA

This application claims the benefit of U.S. provisional patent application No. 62/831,519 filed on Apr. 9, 2019, the entire contents of which is hereby incorporated by reference.

TECHNICAL FIELD

The present disclosure is directed at methods, systems, and techniques for identifying a source of a memory leak.

BACKGROUND

A memory leak may occur on a computer when a process running on that computer improperly allocates and/or deallocates memory, resulting in increased memory usage by that process over time. For example, a process may repeatedly allocate memory without correspondingly deallocating it. Eventually, this can result in the remaining available memory being reduced such that the computer ceases to operate properly. For example, the process and/or the operating system may run more slowly as a result of increased memory paging, or the process and/or operating system may crash or otherwise become unstable.

SUMMARY

According to a first aspect, there is provided a method comprising: determining, by sampling a memory heap at different times, counts of respective allocations of different allocation sizes at the different times; from the counts of the respective allocations at the different times, determining rates at which the respective allocations have changed over the different times; determining which of the rates is equal to or greater than a leak indication rate; and tracing callstacks for the respective allocations of the different allocation sizes for each of the rates that is equal to or greater than the leak indication rate.

The memory heap may be isolated to a process.

Sampling the memory heap may comprise injecting a dynamic-link library (DLL) into the process, the DLL comprising computer program code that is executable by a processor running the process and that, when executed, causes the processor to scan the memory heap and output the counts to a sampling file.

Determining the rates at which the respective allocations have changed over the different times may comprise, for each of the respective allocations, linearly approximating the counts of the respective allocations by performing a linear regression, and estimating the rate for the respective allocation as a rate at which the counts linearly increase over the different times.

An entirety of the memory heap may be sampled at each of the different times.

Sampling the memory heap may be performed on a computing device experiencing a memory leak, and tracing the callstacks may be performed on a testbench of smaller scale than the system experiencing the memory leak.

Sampling the memory heap may be performed on a computing device experiencing a memory leak, and determining the rates at which the respective allocations have changed over the different times and determining which of the rates is equal to or greater than the leak detection rate may be performed using a different computing device.

The method may further comprise intercepting an allocation function call to allocate memory for one of the respective allocations, and tracing the callstack for the one of the respective allocations may be performed in response to the function call and after the intercepting.

Tracing the callstack for the one of the respective allocations may comprise obtaining at least some addresses on the callstack, and the method may further comprise in response to the allocation function call and after the intercepting, storing in a mapping file an address of the one of the respective allocations, a size of the one of the respective allocations, and the at least some addresses on the callstack.

The method may further comprise: intercepting a deallocation function call to deallocate memory for the one of the respective allocations; and removing, from the mapping file, the address of the one of the respective allocations, the size of the one of the respective allocations, and the at least some addresses on the callstack.

The method may further comprise: ordering callstacks in the mapping file by a net number of allocations; and searching through the callstacks in the mapping file in order of highest to lowest of the net number of allocations for an object causing a memory leak.

The method may further comprise: determining a base address of a library loaded into memory when the tracing is performed; determining an offset between the base address and one of the addresses on the callstack stored in the mapping file; and from the base address and the offset, identifying a location in source code corresponding to the object causing the memory leak.

The base address may be nearest to and equal to or less than the one of the addresses on the callstack.

According to another aspect, there is provided a method comprising tracing callstacks for allocations of an allocation size, wherein a rate at which the allocations are changing is equal to or greater than a leak indication rate, and wherein during the tracing, other callstacks for other allocations of another allocation size that are changing at a rate that is less than the leak indication rate are not traced.

The method may further comprise: obtaining counts of respective allocations of different allocation sizes at different times, wherein the allocations whose callstacks are traced comprise part of the respective allocations whose counts are obtained; and from the counts of the respective allocations at the different times, determining that the rate at which the allocations whose callstacks are traced is changing is equal to or greater than the leak indication rate, and that the rate at which the other allocations whose callstacks are not traced is less than the leak indication rate.

The counts of respective allocations of different allocation sizes at different times may comprise histograms of a memory heap at the different times.

According to another aspect, there is provided a non-transitory computer readable medium having stored thereon computer program code that is executable by a processor and that, when executed by the processor, causes the processor to perform the method of any of the foregoing aspects or suitable combinations thereof.

According to another aspect, there is provided a system comprising: a processor; and a non-transitory computer readable medium having stored thereon computer program code that is executable by the processor and that, when executed by the processor, causes the processor to perform the method of any of the foregoing aspects or suitable combinations thereof.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

The detailed description refers to the following figures, in which.

Figure 1:
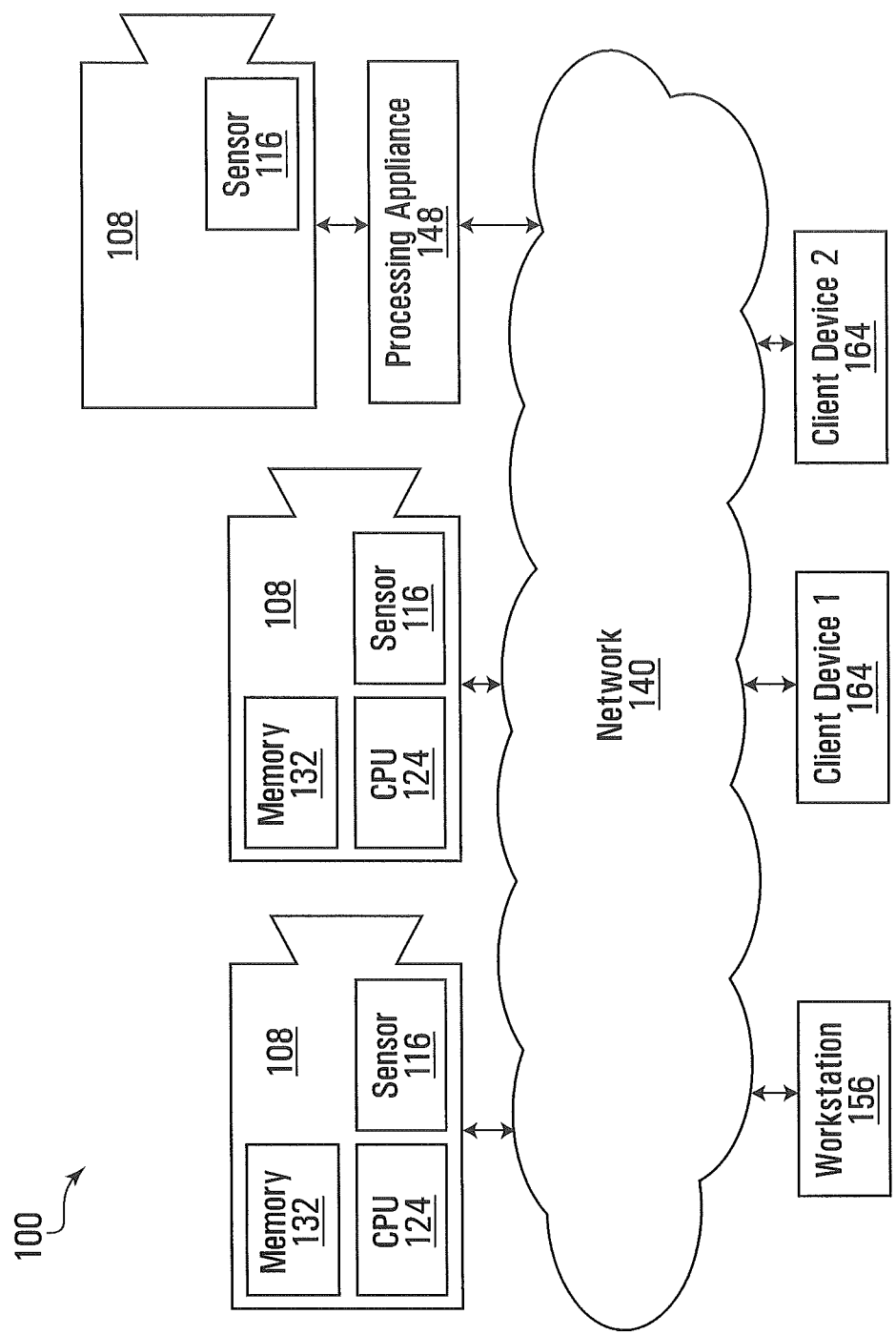
FIG. 1 illustrates a block diagram of connected devices of a video capture and playback system according to an example embodiment.

It will be appreciated that for simplicity and clarity of illustration, elements shown in the figures have not necessarily been drawn to scale. For example, the dimensions of some of the elements may be exaggerated relative to other elements for clarity. Furthermore, where considered appropriate, reference numerals may be repeated among the figures to indicate corresponding or analogous elements.

DETAILED DESCRIPTION

Numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context.

Herein, an image may include a plurality of sequential image frames, which together form a video captured by the video capture device. Each image frame may be represented by a matrix of pixels, each pixel having a pixel image value. For example, the pixel image value may be a numerical value on grayscale (ex; 0 to 255) or a plurality of numerical values for colored images. Examples of color spaces used to represent pixel image values in image data include RGB, YUV, CYKM, YCBCR 4:2:2, YCBCR 4:2:0 images.

Processing video may include, but is not limited to, image processing operations, analyzing, managing, compressing, encoding, storing, transmitting and/or playing back the video data. Analyzing the video may include segmenting areas of image frames and detecting visual objects, tracking and/or classifying visual objects located within the captured scene represented by the image data. The processing of the image data may also cause additional information regarding the image data or visual objects captured within the images to be output. For example, such additional information is commonly understood as metadata. The metadata may also be used for further processing of the image data, such as drawing bounding boxes around detected objects in the image frames. "Metadata" or variants thereof herein refers to such information obtained by computer-implemented analysis of images, including images, in video.

As will be appreciated by one skilled in the art, the various example embodiments described herein may be embodied as a method, system, or computer program product. Accordingly, the various example embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, the various example embodiments may take the form of a computer program product on a computer-usable storage medium having computer-usable program code embodied in the medium Any suitable computer-usable or computer readable medium may be utilized. The computer-usable or computer-readable medium may be, for example but not limited to, an electronic, magnetic, optical, electromagnetic, infrared, or semiconductor system, apparatus, device, or propagation medium. In the context of this document, a computer-usable or computer-readable medium may be any medium that can contain, store, communicate, propagate, or transport the program for use by or in connection with the instruction execution system, apparatus, or device.

Computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

Various example embodiments are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring now to FIG. 1, therein illustrated is a block diagram of connected devices of a video capture and playback system 100 according to an example embodiment. For example, the video capture and playback system 100 may be used as a video surveillance system. The video capture and playback system 100 includes hardware and software that perform the processes and functions described herein.

The video capture and playback system 100 includes at least one video capture device 108 being operable to capture a plurality of images and produce image data representing the plurality of captured images. The video capture device 108 or camera 108 is an image capturing device and includes security video cameras.

Each video capture device 108 includes at least one image sensor 116 for capturing a plurality of images. The video capture device 108 may be a digital video camera and the image sensor 116 may output captured light as a digital data. For example, the image sensor 116 may be a CMOS, NMOS, or CCD. In some embodiments, the video capture device 108 may be an analog camera connected to an encoder.

The at least one image sensor 116 may be operable to capture light in one or more frequency ranges. For example, the at least one image sensor 116 may be operable to capture light in a range that substantially corresponds to the visible light frequency range. In other examples, the at least one image sensor 116 may be operable to capture light outside the visible light range, such as in the infrared and/or ultraviolet range. In other examples, the video capture device 108 may be a multi-sensor camera that includes two or more sensors that are operable to capture light in different frequency ranges.

The at least one video capture device 108 may include a dedicated camera. It will be understood that a dedicated camera herein refers to a camera whose principal features is to capture images or video. In some example embodiments, the dedicated camera may perform functions associated with the captured images or video, such as but not limited to processing the image data produced by it or by another video capture device 108. For example, the dedicated camera may be a surveillance camera, such as any one of a pan-tilt-zoom camera, dome camera, in-ceiling camera, box camera, and bullet camera.

Additionally, or alternatively, the at least one video capture device 108 may include an embedded camera. It will be understood that an embedded camera herein refers to a camera that is embedded within a device that is operational to perform functions that are unrelated to the captured image or video. For example, the embedded camera may be a camera found on any one of a laptop, tablet, drone device, smartphone, video game console or controller.

Each video capture device 108 includes one or more processors 124, one or more memory devices 132 coupled to the processors and one or more network interfaces. The memory device can include a local memory (such as, for example, a random access memory and a cache memory) employed during execution of program instructions. The processor executes computer program instructions (such as, for example, an operating system and/or application programs), which can be stored in the memory device.

In various embodiments the processor 124 may be implemented by any suitable processing circuit having one or more circuit units, including a digital signal processor (DSP), graphics processing unit (GPU) embedded processor, a visual processing unit or a vison processing unit (both referred to herein as "VPU"), etc., and any suitable combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any suitable combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example.

In various example embodiments, the memory device 132 coupled to the processor circuit is operable to store data and computer program instructions. Typically, the memory device is all or part of a digital electronic integrated circuit or formed from a plurality of digital electronic integrated circuits. The memory device may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device may be operable to store memory as volatile memory, non-volatile memory, dynamic memory, etc. or any combination thereof.

In various example embodiments, a plurality of the components of the image capture device 108 may be implemented together within a system on a chip (SOC). For example, the processor 124, the memory device 116 and the network interface may be implemented within a SOC. Furthermore, when implemented in this way, a general purpose processor and one or more of a GPU or VPU, and a DSP may be implemented together within the SOC.

Continuing with FIG. 1, each of the at least one video capture device 108 is connected to a network 140. Each video capture device 108 is operable to output image data representing images that it captures and transmit the image data over the network.

It will be understood that the network 140 may be any suitable communications network that provides reception and transmission of data. For example, the network 140 may be a local area network, external network (such as, for example, a WAN, or the Internet) or a combination thereof. In other examples, the network 140 may include a cloud network.

In some examples, the video capture and playback system 100 includes a processing appliance 148. The processing appliance 148 is operable to process the image data output by a video capture device 108. The processing appliance 148 also includes one or more processors and one or more memory devices coupled to a processor (CPU). The processing appliance 148 may also include one or more network interfaces. For convenience of illustration, only one processing appliance 148 is shown; however it will be understood that the video capture and playback system 100 may include any suitable number of processing appliances 148.

For example, and as illustrated, the processing appliance 148 is connected to a video capture device 108 which may not have memory 132 or CPU 124 to process image data. The processing appliance 148 may be further connected to the network 140.

According to one example embodiment, and as illustrated in FIG. 1, the video capture and playback system 100 includes at least one workstation 156 (such as, for example, a server), each having one or more processors including graphics processing units (GPUs). The at least one workstation 156 may also include storage memory. The workstation 156 receives image data from at least one video capture device 108 and performs processing of the image data. The workstation 156 may further send commands for managing and/or controlling one or more of the image capture devices 108. The workstation 156 may receive raw image data from the video capture device 108. Alternatively, or additionally, the workstation 156 may receive image data that has already undergone some intermediate processing, such as processing at the video capture device 108 and/or at a processing appliance 148. The workstation 156 may also receive metadata from the image data and perform further processing of the image data.

It will be understood that while a single workstation 156 is illustrated in FIG. 1, the workstation may be implemented as an aggregation of a plurality of workstations.

The video capture and playback system 100 further includes at least one client device 164 connected to the network 140. The client device 164 is used by one or more users to interact with the video capture and playback system 100. Accordingly, the client device 164 includes at least one display device and at least one user input device (such as, for example, a mouse, keyboard, or touchscreen). The client device 164 is operable to display on its display device a user interface for displaying information, receiving user input, and playing back video. For example, the client device may be any one of a personal computer, laptops, tablet, personal data assistant (PDA), cell phone, smart phone, gaming device, and other mobile device.

The client device 164 is operable to receive image data over the network 140 and is further operable to playback the received image data. A client device 164 may also have functionalities for processing image data. For example, processing functions of a client device 164 may be limited to processing related to the ability to playback the received image data. In other examples, image processing functionalities may be shared between the workstation 186 and one or more client devices 164.

In some examples, the image capture and playback system 100 may be implemented without the workstation 156. Accordingly, image processing functionalities may be wholly performed on the one or more video capture devices 108. Alternatively, the image processing functionalities may be shared amongst two or more of the video capture devices 108, processing appliance 148 and client devices 164.

Figure 2A:
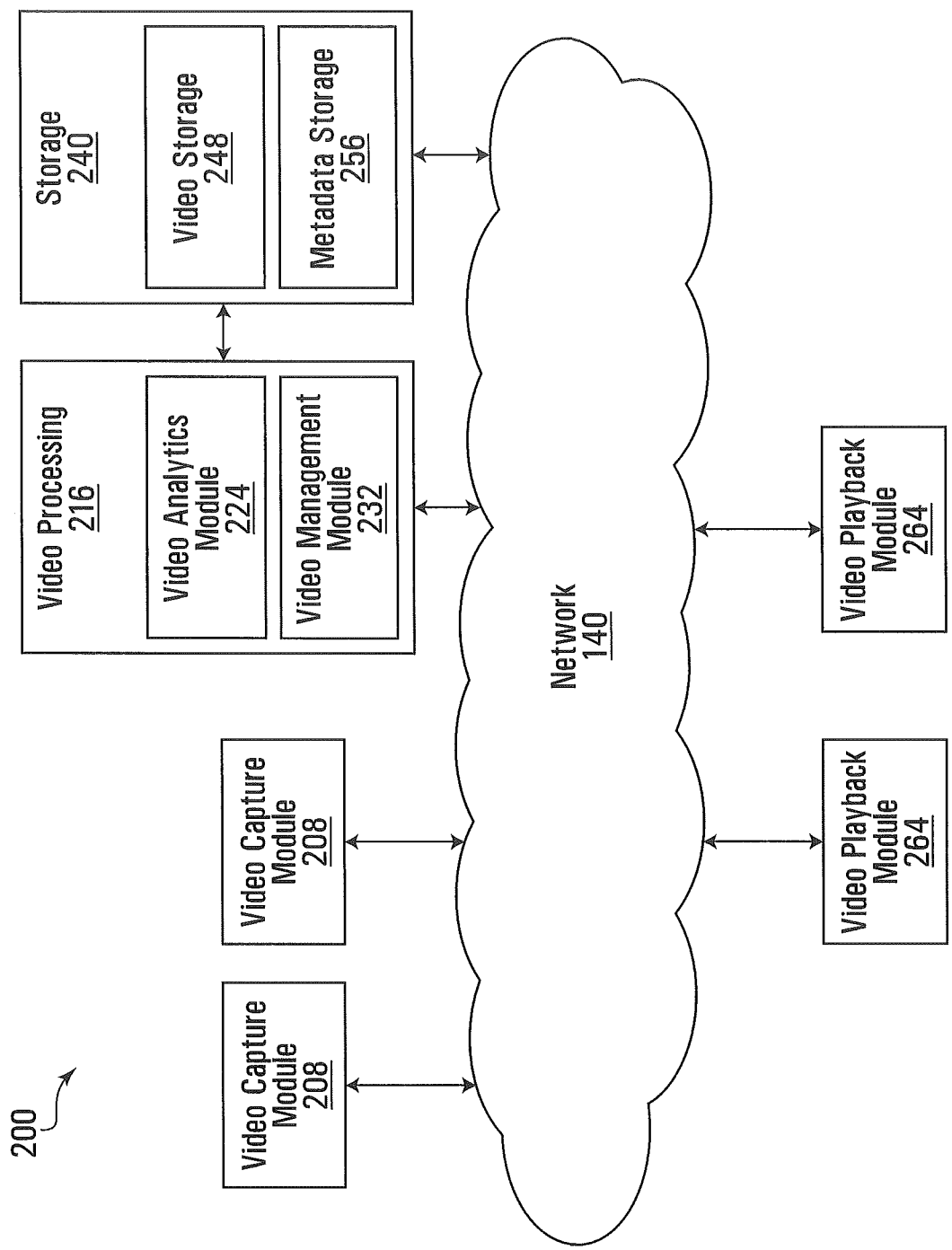
FIG. 2A illustrates a block diagram of a set of operational modules of the video capture and playback system according to one example embodiment.

Referring now to FIG. 2A, therein illustrated is a block diagram of a set 200 of operational modules of the video capture and playback system 100 according to one example embodiment. The operational modules may be implemented in hardware, software or both on one or more of the devices of the video capture and playback system 100 as illustrated in FIG. 1.

The set 200 of operational modules include at least one video capture module 208. For example, each video capture device 108 may implement a video capture module 208. The video capture module 208 is operable to control one or more components (such as, for example, sensor 116) of a video capture device 108 to capture images.

The set 200 of operational modules includes a subset 216 of image data processing modules. For example, and as illustrated, the subset 216 of image data processing modules includes a video analytics module 224 and a video management module 232.

The video analytics module 224 receives image data and analyzes the image data to determine properties or characteristics of the captured image or video and/or of objects found in the scene represented by the image or video. Based on the determinations made, the video analytics module 224 may further output metadata providing information about the determinations. Examples of determinations made by the video analytics module 224 may include one or more of foreground/background segmentation, object detection, object tracking, object classification, virtual tripwire, anomaly detection, facial detection, facial recognition, license plate recognition, identifying objects "left behind" or "removed", unusual motion, and business intelligence.

However, it will be understood that other video analytics functions known in the art may also be implemented by the video analytics module 224.

The video management module 232 receives image data and performs processing functions on the image data related to video transmission, playback and/or storage. For example, the video management module 232 can process the image data to permit transmission of the image data according to bandwidth requirements and/or capacity. The video management module 232 may also process the image data according to playback capabilities of a client device 164 that will be playing back the video, such as processing power and/or resolution of the display of the client device 164. The video management module 232 may also process the image data according to storage capacity within the video capture and playback system 100 for storing image data.

It will be understood that according to some example embodiments, the subset 216 of video processing modules may include only one of the video analytics module 224 and the video management module 232.

The set 200 of operational modules further include a subset 240 of storage modules. For example, and as illustrated, the subset 240 of storage modules include a video storage module 248 and a metadata storage module 256. The video storage module 248 stores image data, which may be image data processed by the video management module. The metadata storage module 256 stores information data output from the video analytics module 224.

It will be understood that while video storage module 248 and metadata storage module 256 are illustrated as separate modules, they may be implemented within a same hardware storage whereby logical rules are implemented to separate stored video from stored metadata. In other example embodiments, the video storage module 248 and/or the metadata storage module 256 may be implemented using hardware storage using a distributed storage scheme.

The set of operational modules further includes at least one video playback module 264, which is operable to receive image data and playback the image data as a video. For example, the video playback module 264 may be implemented on a client device 164.

The operational modules of the set 200 may be implemented on one or more of the image capture device 108, processing appliance 148, workstation 156 and client device 164. In some example embodiments, an operational module may be wholly implemented on a single device. For example, video analytics module 224 may be wholly implemented on the workstation 156. Similarly, video management module 232 may be wholly implemented on the workstation 156.

In other example embodiments, some functionalities of an operational module of the set 200 may be partly implemented on a first device while other functionalities of an operational module may be implemented on a second device. For example, video analytics functionalities may be split between one or more of an image capture device 108, processing appliance 148 and workstation 156. Similarly, video management functionalities may be split between one or more of an image capture device 108, processing appliance 148 and workstation 156.

Figure 2B:
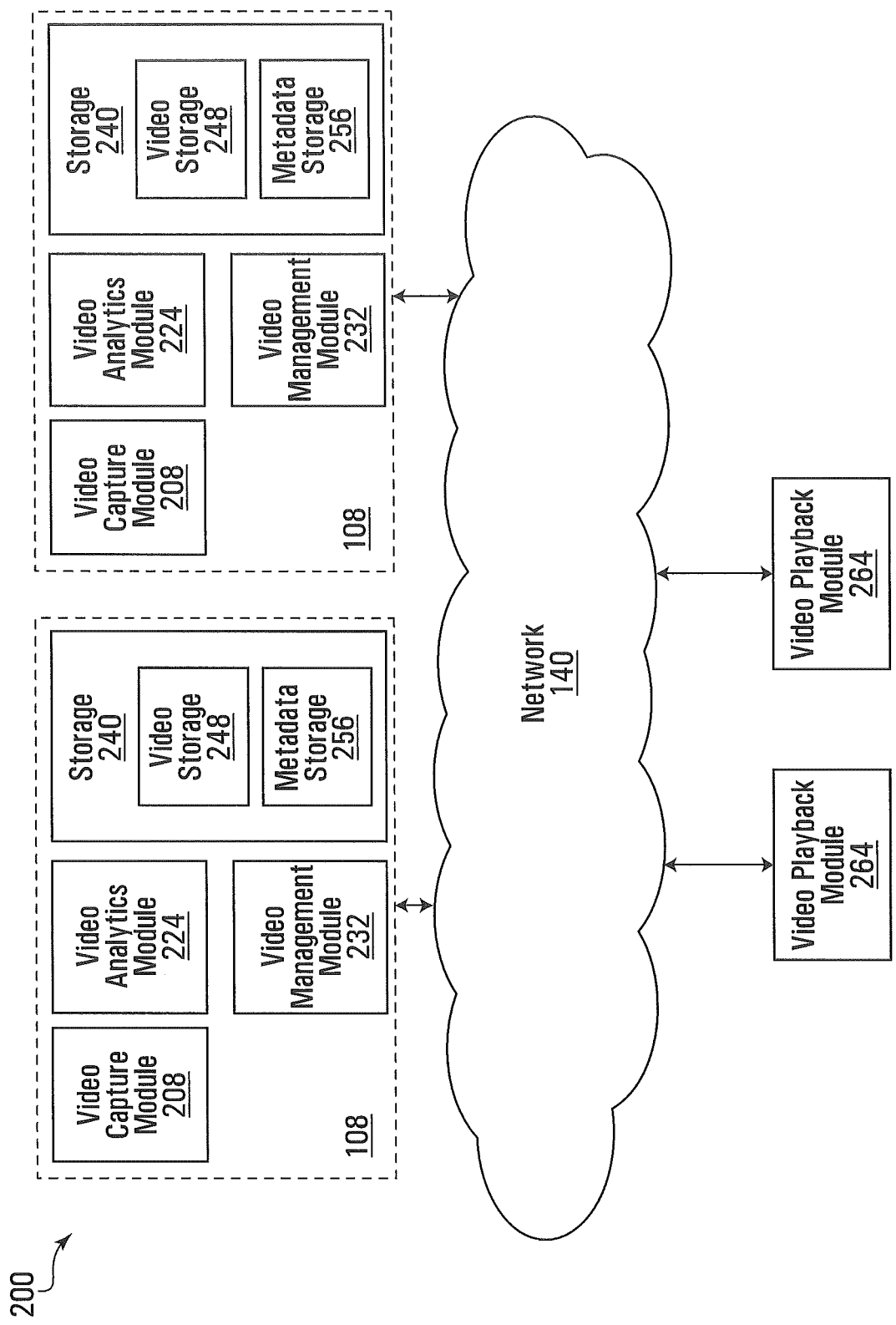
FIG. 2B illustrates a block diagram of a set of operational modules of the video capture and playback system according to one particular example embodiment in which the video analytics module 224, the video management module 232, and the storage 240 are wholly implemented on the one or more image capture devices 108.

Referring now to FIG. 2B, therein illustrated is a block diagram of a set 200 of operational modules of the video capture and playback system 100 according to one particular example embodiment wherein the video analytics module 224, the video management module 232 and the storage 240 is wholly implemented on the one or more image capture devices 108. Alternatively, the video analytics module 224, the video management module 232 and the storage 240 is wholly or partially implemented on one or more processing appliances 148.

It will be appreciated that allowing the subset 216 of image data (video) processing modules to be implemented on a single device or on various devices of the video capture and playback system 100 allows flexibility in building the system 100.

For example, one may choose to use a particular device having certain functionalities with another device lacking those functionalities. This may be useful when integrating devices from different parties (such as, for example, manufacturers) or retrofitting an existing video capture and playback system.

Any of the computing devices that comprise part of the video capture and playback system 100, such as the workstation 156, video capture device 108, and client device 164, may experience a memory leak while the system 100 is operating. Part of troubleshooting a memory leak is identifying the one or more objects whose improper allocations and/or deallocations are causing the leak, and the location in the source code version of the computer program code that the computing device is executing in which memory for those one or more objects is allocated and deallocated. Conventionally, this is done using a tracing tool such as Valgrind™ (for the Linux™ operating system) or UMDH (for the Windows™ operating system). A tracing tool records the callstacks of all function calls that allocate or deallocate memory, as well as the addresses of the allocations. All allocations that have not been freed by the end of the tracing tool's run are grouped by identical callstack and summarized to the user as <callstack, allocation count, allocation size>. The callstacks with the largest total allocation (i.e., largest allocation count multiplied by allocation size) point to locations that may be a source of the memory leak.

Identifying the source of a memory leak in this manner has several drawbacks. For example, recording callstacks comes with a performance penalty. An application or process will run on some computing devices approximately five to ten times slower when being traced compared to when it isn't. This makes conventional callstack tracing impractical on systems in a production environment in which the hardware capacity of the computing device suffering from the leak has already been provisioned for full use.

Additionally, some applications cache data to increase performance. During callback tracing, cached data is a false positive that mimics a memory leak. While the tracing results for the cached data can be filtered out, this decreases the efficiency with which the source of the leak can be identified. Alternatively, caching can be disabled during tracing; however, this results in performance degradation that is in addition to the degradation resulting from the tracing itself.

Further, callstack tracing results in collecting and storing a large amount of data. This makes it difficult to perform tracing for long periods of time, such as multiple days, which may be necessary to identify the source of a slowly growing leak.

At least some of the example embodiments described herein address one or more of the aforementioned problems by identifying which one or more allocation sizes are potential sources of a memory leak, and subsequently tracing callstacks for only those allocation sizes as opposed to for all possible allocation sizes. A memory heap is sampled at different times, which permits determination of counts of allocations of respective allocation sizes at those different times. From those counts, the rates at which the allocations of the respective allocation sizes have changed over time can be determined. For example, a linear regression may be performed on the counts of the respective allocations to linearly approximate them, and the rates for each of the respective allocations can be treated as the slope of the resulting linear model. This slope can then be compared to a leak indication rate. Those allocations whose rates meet or exceed the leak indication rate are potential sources of a memory leak, and callstack tracing is performed in respect of allocations and deallocations of that size. Sampling the memory heap is much less computationally intensive, and generates much less data, than callstack tracing the corresponding number of allocation sizes. For example, each time the memory heap is sampled, only a few kilobytes of storage may be required to record a table with entries of counts and allocation sizes. Additionally, when the entire memory heap is sampled, a sufficiently large amount of information is gathered such that sampling may be done fairly infrequently (e.g., once every fifteen minutes). Further, processing the sampled data may be done using a different computing device than the device suffering from the memory leak, thereby preserving resources of the device suffering from the leak, which may still be in a production environment.

Once certain allocation sizes have been identified as potential candidates for the memory leak's source, callstack tracing for only those allocation sizes may be orders of magnitude faster and generate orders of magnitude less data than tracing all allocation sizes. Further, tracing in at least some example embodiments may be performed using a smaller scale, testbench setup that provides testing flexibility and conserves resources of the device experiencing the leak. Accordingly, at least some example embodiments herein can more efficiently and quickly identify the source of a memory leak than conventional callstack tracing.

In the following example embodiments, one of the workstations 156 in the form of a server is used as an example computing device that is experiencing a memory leak. However, in at least some different example embodiments, one or more other computing devices comprising part of the video capture and playback system 100 may additionally or alternatively be experiencing a memory leak.

Figure 3:
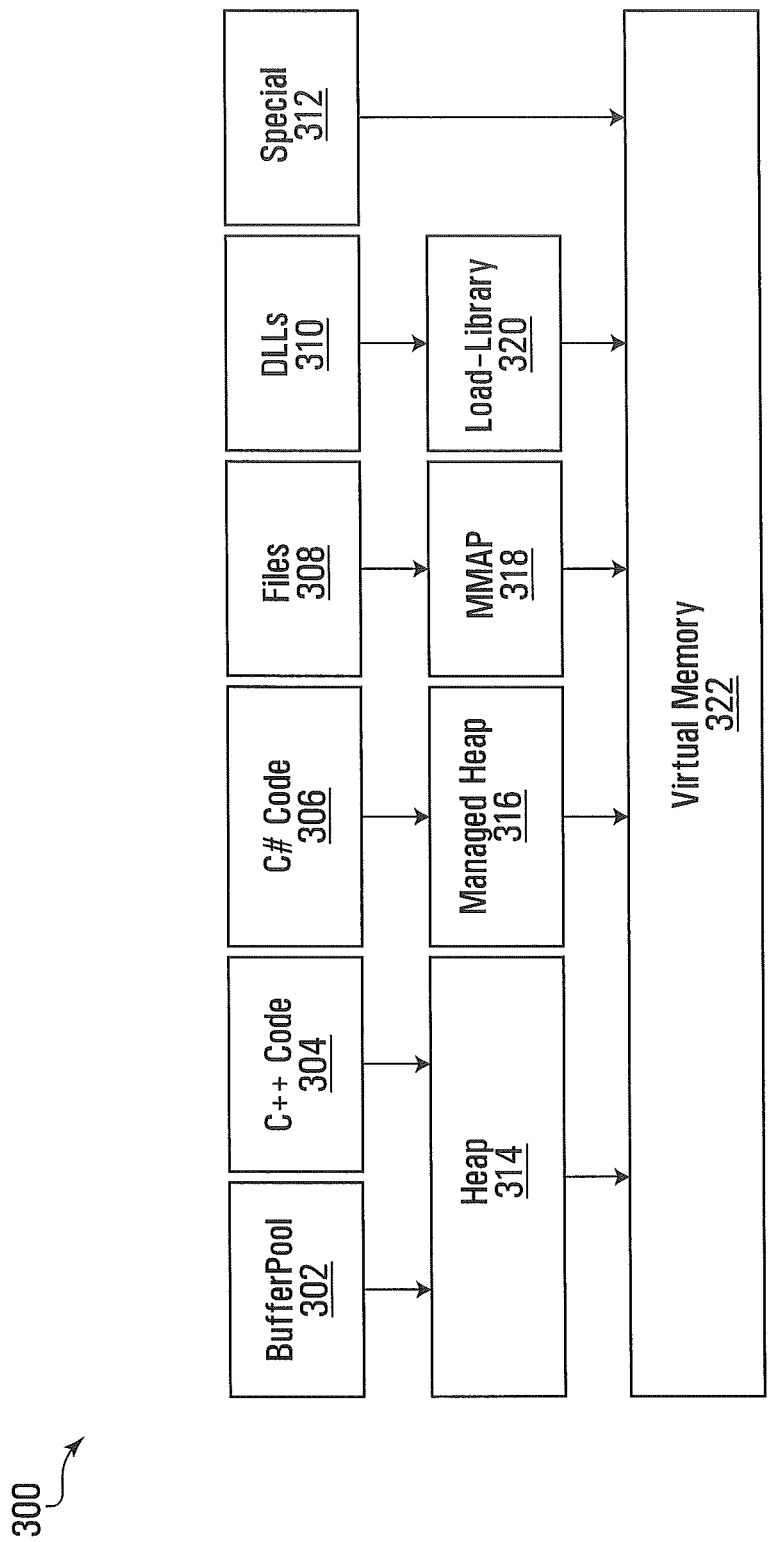
FIG. 3 illustrates a memory hierarchy of an operating system running on the video capture and playback system, according to one example embodiment.

Referring now to FIG. 3, there is depicted a memory hierarchy 300 of an operating system running on the workstation 156 experiencing a memory leak, according to one example embodiment. The operating system's page manager controls virtual memory 322. Different executables running in an application layer of the operating system allocate memory, directly or indirectly, from the virtual memory 322. A BufferPool 302 and C++ program code 304 (via the "new" operator or malloc( ) function, for example) allocate memory from an unmanaged memory heap 314, which in turn is allocated from the virtual memory 322. C# program code 306, which is an example of managed program code, allocates memory from a managed memory heap 316, which in turn is allocated from the virtual memory 322. Files 308 are allocated virtual memory 322 by a memory map (MMAP) module 318; dynamic-link libraries (each a DLL) 310 are allocated virtual memory 322 by a load-library module 320; and certain special files or applications 312 may allocate virtual memory 322 directly (e.g., an application may want to: custom allocate memory 322; allocate non-pageable memory, which may be a requirement for direct memory access; or implement a custom heap/allocator).

Figure 4:
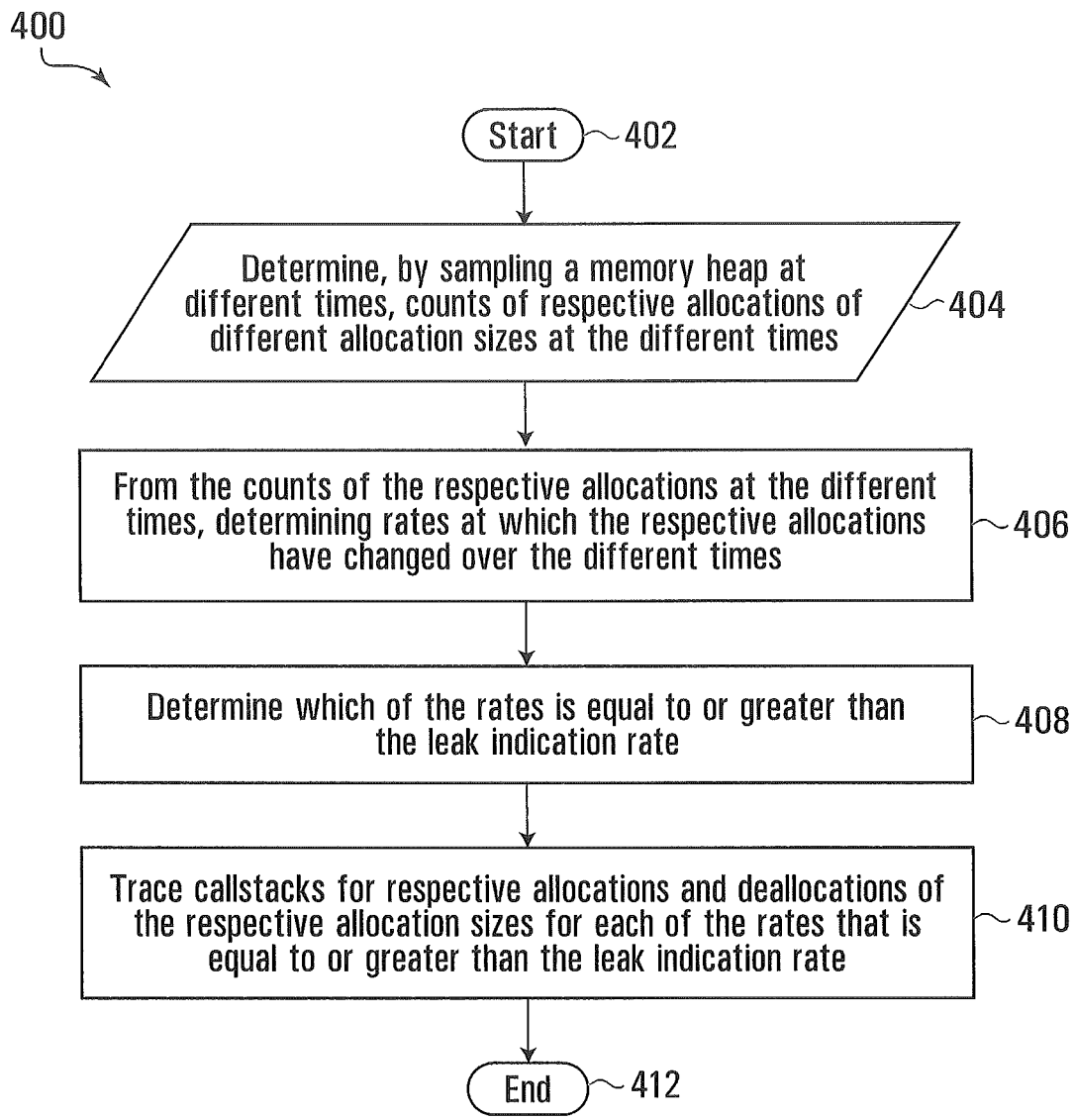
FIG. 4 depicts a method for tracing callstacks, which can be used to identify a source of a memory leak, according to one example embodiment.

Referring now to FIG. 4, there is depicted a method 400 for tracing callstacks, which can be used to identify a source of a memory leak, according to an example embodiment. In the context of the memory hierarchy 300 of FIG. 3, a memory leak results when the C++ program code 304 allocates memory without correspondingly deallocating that memory over time. Some or all of the operations comprising the method 400 may be expressed as computer program code, stored in the workstation's 156 storage and executed by the workstation's 156 processor. The method 400 is applied to the workstation 156 to identify the source of a memory leak that the workstation 156 is experiencing.

Figure 5:
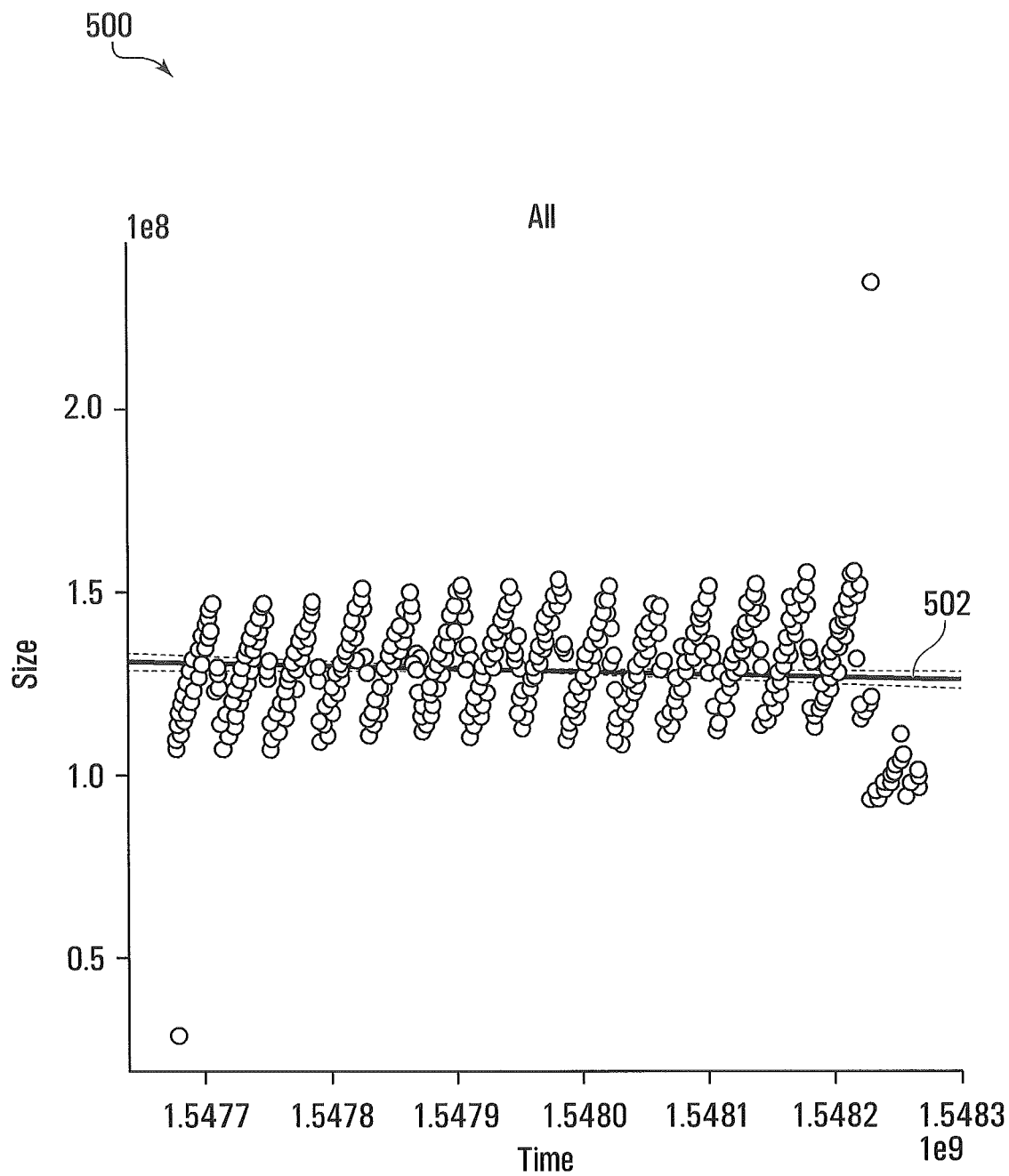
FIG. 5 depicts a graph of total allocated bytes of memory over a time period for the video capture and playback system when it is experiencing a memory leak, according to one example embodiment.

FIG. 5 depicts a graph 500 of total allocated bytes of memory from the workstation's 156 memory heap 314 over the course of approximately one week while the workstation 156 is experiencing the memory leak. The graph 500 includes a line 502 generated from a linear regression of the data points on the graph 500. As is evident from FIG. 5, the slope of the line 502 is approximately zero despite the fact that the workstation 156 is experiencing a memory leak and that the graph 500 shows approximately a week's worth of data. This implies that the memory leak is slowly growing.

Figure 6:
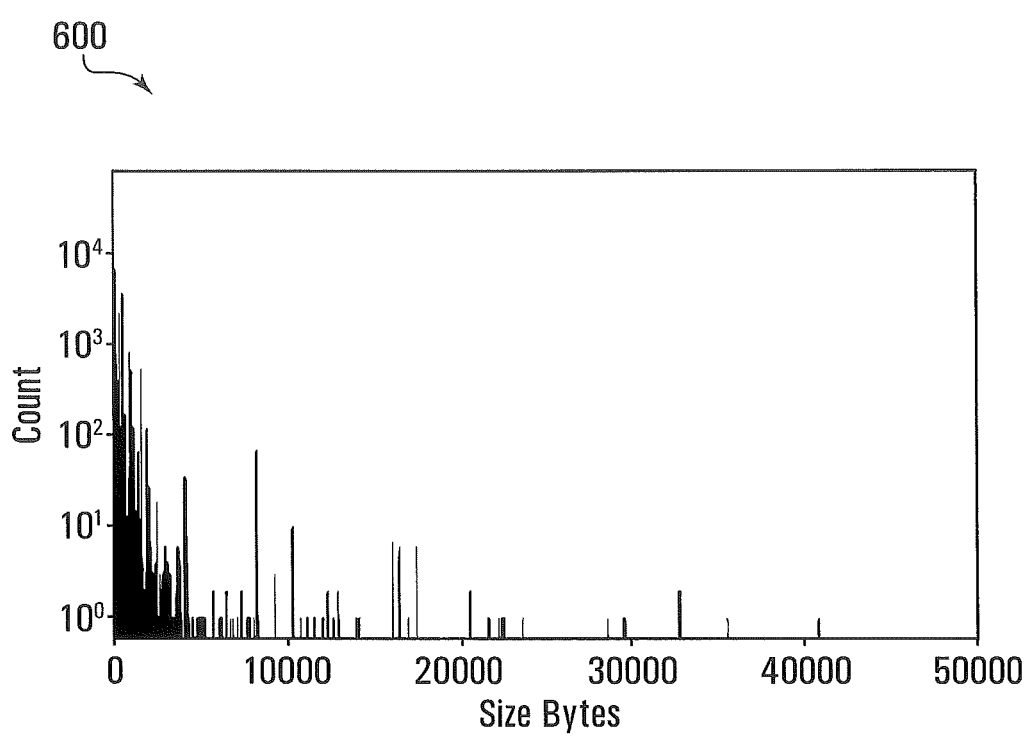
FIG. 6 depicts a histogram of allocation counts vs. allocation size acquired by sampling a memory heap of the video capture and playback system of FIG. 5 while it is experiencing the memory leak.

To identify the leak's source, the workstation's 156 processor begins the method 400 at block 402 and proceeds to block 404 where it determines, by sampling the memory heap 314 at different times, counts of respective allocations of different allocation sizes at those different times. The sampling may be performed using computer program code that is packaged as a DLL and that is injected into a process whose allocations are to be traced. During execution, this DLL spawns a thread that when loaded scans, or "walks", the memory heap 314 and dumps the number of allocations of each allocation size to a sampling file. FIG. 6 displays a histogram of allocation counts vs. allocation size as dumped to a file at one of the times the DLL walks the heap. In FIG. 6, the histogram represents data as collected in a particular state. In at least the presently described example embodiment, the heap 314 is locked while it is being scanned to prevent it from being modified, thereby resulting in a histogram showing the heap 314 in a particular state despite the heap being scanned over a non-instantaneous window of time; as used herein, sampling the heap 314 "at different times" includes sampling the heap during a first window of time that starts at one time and during a second window of time that starts at another, different time. In the example of FIG. 6, the sampling of the memory heap 314 is done in respect of a single process; however, in at least some different example embodiments, the sampling may be done in respect of multiple processes. In at least the presently described example embodiment, different processes have their own respective memory heaps 314, which are isolated from each other. Consequently, in those different example embodiments different instances of the DLL used to walk the memory heap 314 may be respectively injected into those different processes and used to concurrently and independently sample those different heaps 314. Additionally, in the example of FIG. 6 all allocations (i.e., the entire state of the heap 314) are sampled and depicted, regardless of their size; however, in at least some different example embodiments, sampling may be limited to only some of the actual or possible allocations. As a fairly large amount of information (i.e., the entire state of the heap 314) is collected with each sample in FIG. 6, sampling may be done at fairly infrequent intervals (e.g., once every fifteen minutes). Sampling may be done at regular intervals, irregular intervals, or a combination of regular and irregular intervals over time.

Each data point in the histogram 600 of FIG. 6 may be stored in a data structure of format <counts,allocSize>, where "allocSize" refers to a memory allocation size and "counts" refers to the number of times an allocation of that size exists in the heap 314. In at least some example embodiments, the workstation's 156 processor stores the data acquired during the sampling of block 404 to storage, and the stored data is subsequently transferred to a different computing device, such as one of the client devices 164, another of the workstations 156, or a computing device not depicted in FIG. 1, for further processing at block 406. In the presently described example embodiment, a computer located at an off-site location ("off-site computer") is used to perform block 406. The off-site computer may, for example, be a computer owned by a party contracted to provide support services for the video capture and playback system 100.

Figure 7A:
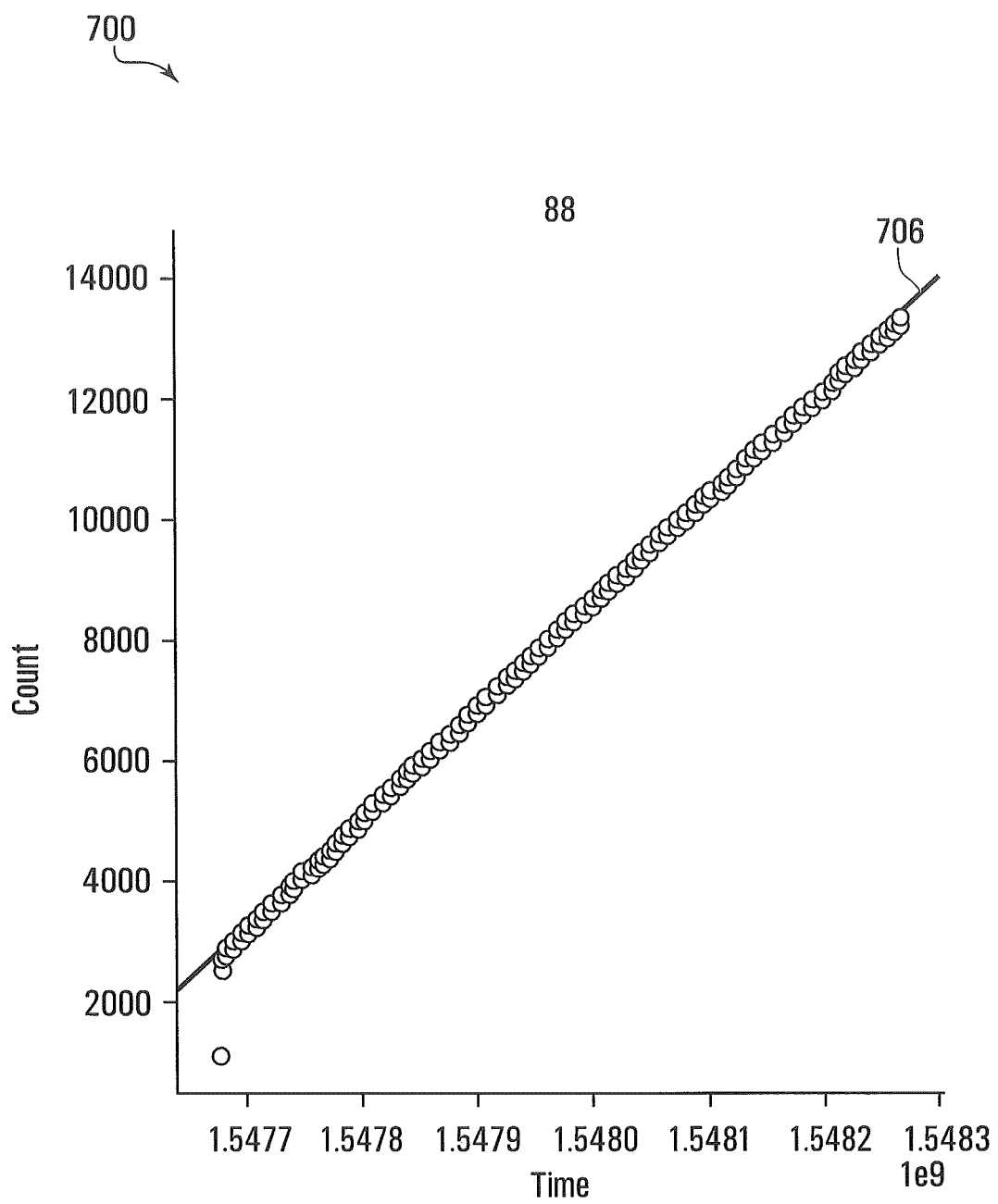
FIGS. 7A and 7B each depicts a graph of allocation counts for a certain allocation size, with each of the graphs being indicative of a source of the memory leak that the video capture and playback system of FIG. 5 is experiencing.
Figure 7B:
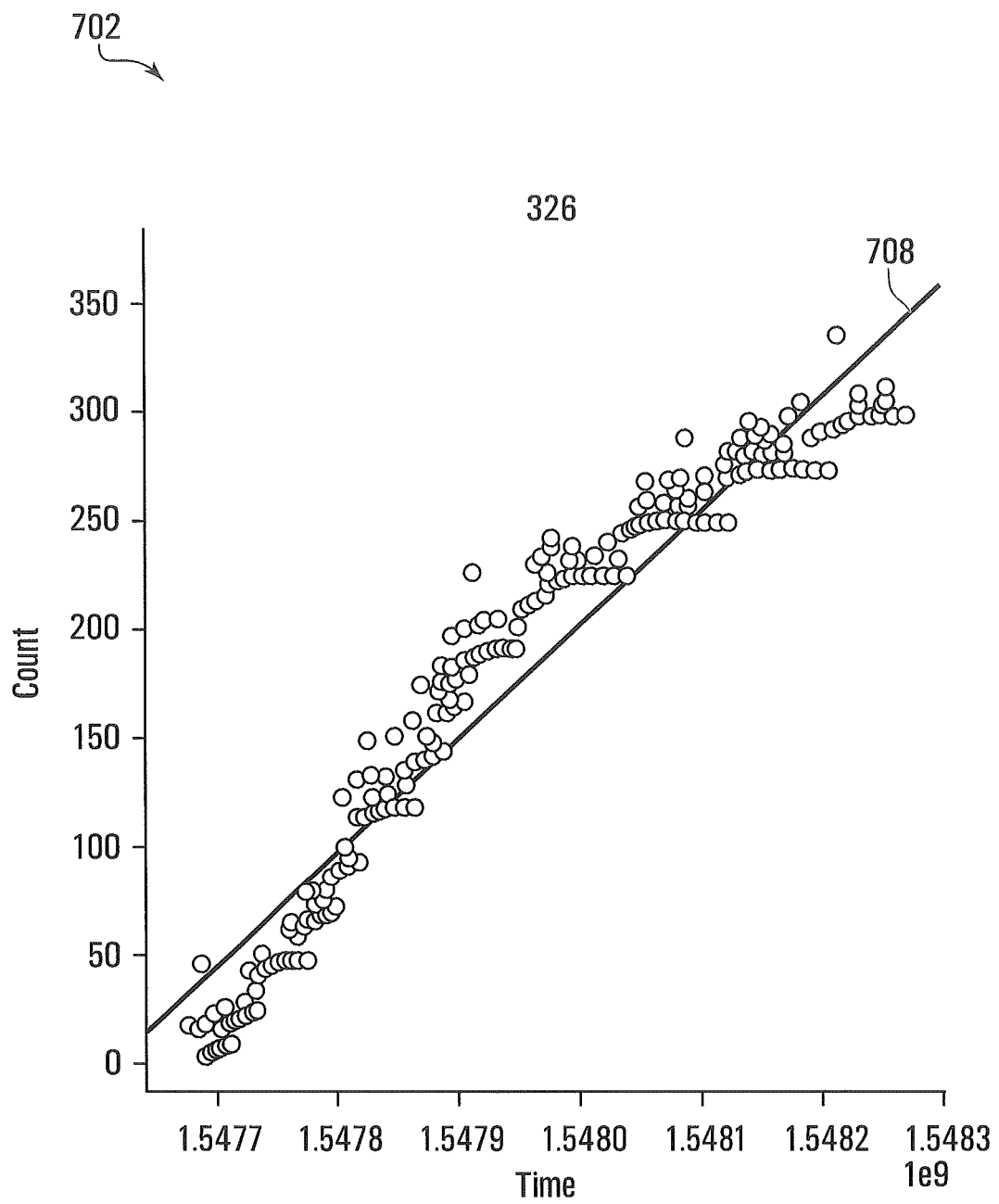
Figure 8A:
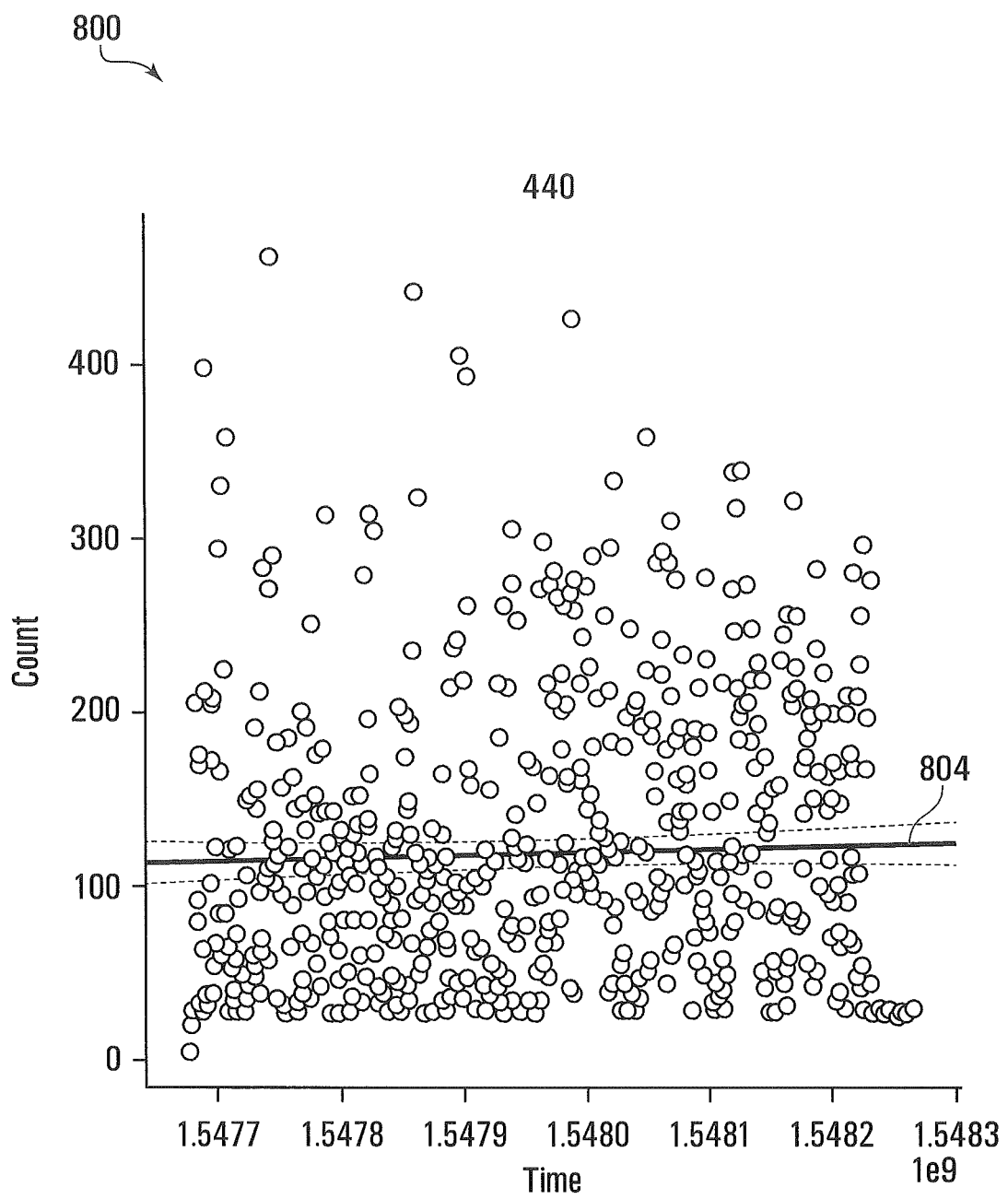
FIGS. 8A and 8B each depicts a graph of allocation counts for a certain allocation size, with neither of the graphs being indicative of the memory leak that the video capture and playback system of FIG. 5 is experiencing.
Figure 8B:
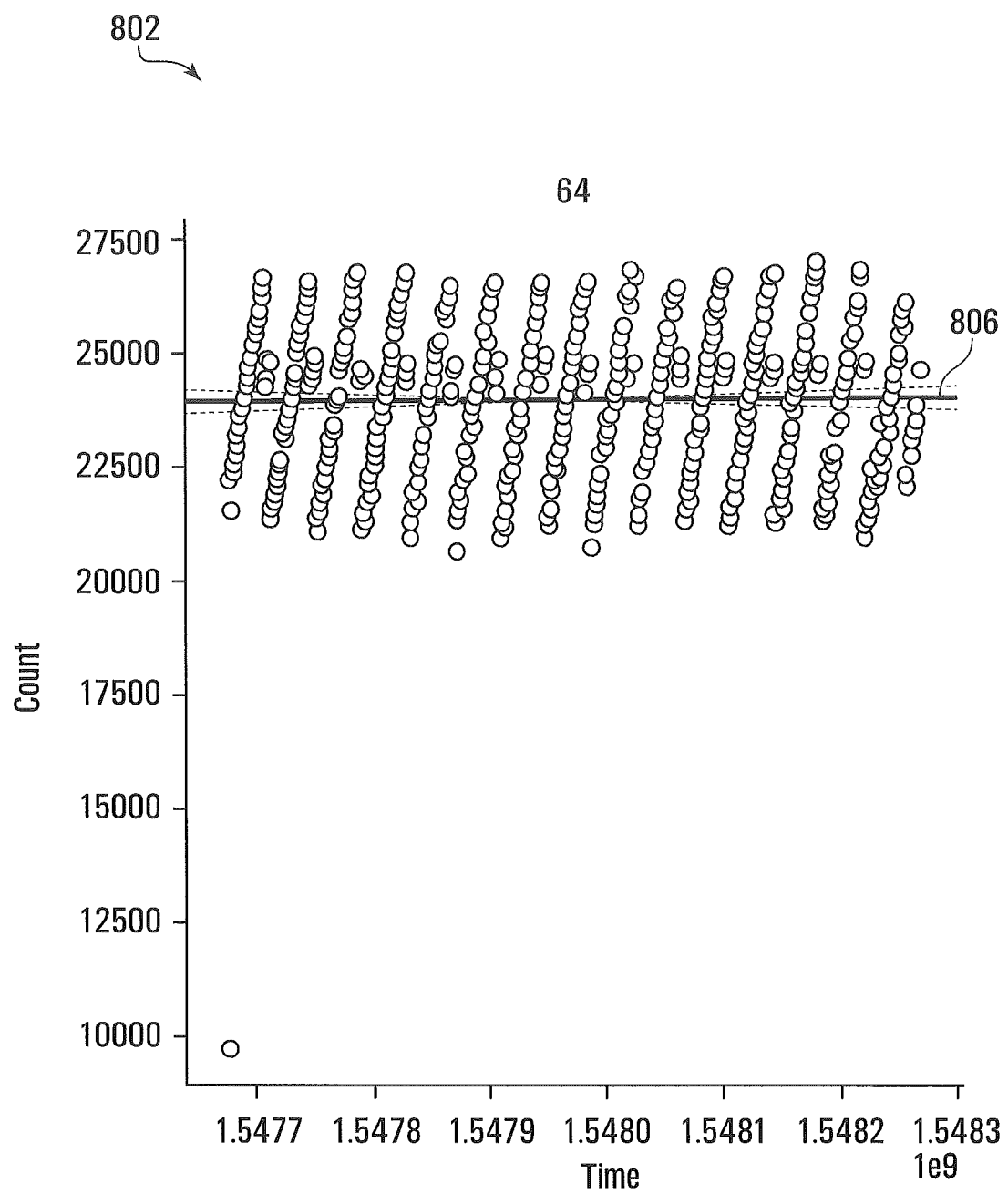

At block 406, the off-site computer determines, from the counts of the respective allocations at the different times as obtained at block 404, rates at which the respective allocations have changed over the different times. Over the same time scale as FIG. 5, each of FIGS. 7A and 7B depicts a graph of allocation counts for a certain allocation size in which the graphs indicate that allocations of those sizes are a source of the memory leak, whereas each of FIGS. 8A and 8B depicts a graph of allocation counts for a certain allocation size in which the graphs indicate that allocations of those sizes are unlikely to be a source of the memory leak. In each of FIGS. 7A, 7B, 8A, and 8B, the off-site computer linearly approximates the counts of the respective allocations by performing a linear regression, and estimates the rate for the respective allocation as a rate at which the counts linearly increase over time.

More particularly, FIG. 7A shows a graph 700 of counts of allocations having an allocation size of 88 bytes. The off-site computer performs a linear regression on the data points of the graph 700, resulting in a line 706, with the slope of the line corresponding to the rate at which the number of memory allocations of 88 bytes changes over time. In the case of FIG. 7A, this slope is approximately 11,000 allocations over 7 days, or 140 KB/day. FIG. 7B shows a graph 702 analogous to the graph 700 of FIG. 7A, except that the allocation size for the graph 702 of FIG. 7B is 326 bytes. Applying a linear regression to the data points of the graph 702 of FIG. 7B results in a line 708 with a slope of approximately 310 allocations over 7 days, or 14 KB/day.

FIG. 8A shows a graph 800 of counts of allocations having an allocation size of 440 bytes. In contrast to the graphs 700,702 of FIGS. 7A and 7B, the data points of the graph 800 of FIG. 8A are fairly widely scattered. Performing a linear regression consequently results in a line 804 having a slope of approximately zero. Similarly, FIG. 8B shows a graph 802 of counts of allocations having an allocation size of 64 bytes. The allocations follow a saw tooth pattern resulting in its linear regression also corresponding to a line 806 of approximately zero slope.

While the off-site computer performs a linear regression on the data points in FIGS. 7A, 7B, 8A, and 8B in order to determine the rate of change of the allocations as depicted in the graphs 700,702,800,802, in at least some different example embodiments the off-site computer may determine the rate of change differently. For example, the off-site computer may apply a non-linear regression or avoid regression analysis altogether.

After block 406, the off-site computer proceeds to block 408 where it then determines which of the rates determined at block 406 is equal to or greater than a leak indication rate, with the allocation sizes having counts that meet or exceed the leak indication rate being more likely to be a source of the memory leak than those which do not. The leak indication rate may be empirically determined; for example, in the examples of FIGS. 7A, 7B, 8A, and 8B, it may be set to 5 KB/day. In some different example embodiments, the leak indication rate may vary with the system's 100 up-time requirement. For example, if the system 100 has a memory heap 314 size of 4 GB and a minimum up-time requirement of 6 months, then the maximum leak indication rate is constrained to be less than 20 MB/day. More generally, then, the maximum leak indication rate may be the size of the memory heap 314 divided by the minimum up-time of the system 100. In still other example embodiments, the leak indication rate may be any non-negative rate. With a leak indication rate of 5 KB/day, the off-site computer determines that the rates for allocations having sizes of 88 bytes and 326 bytes (FIGS. 7A and 7B) meet or exceed the leak indication rate, and that the rates for allocations having sizes of 440 bytes and 64 bytes (FIGS. 8A and 8B) do not. The off-site computer may perform the operations of blocks 406 and 408 by executing a parsing script written in any suitable scripting language, such as the Python™ language, for example.

Once the off-site computer has identified which allocations are the potential leak sources, the callstacks for those respective allocations having those allocation sizes can be traced at block 410. In at least some example embodiments, only one callstack is traced per allocation, although multiple callstacks may exist for the same allocation as the object that is allocated could be allocated on different paths. Furthermore, while in at least the presently described embodiment multiple callstacks are traced when tracing allocations of a particular size, in at least some example embodiments only a single callstack may be traced. Accordingly, in at least some example embodiments, a reference to callstacks being traced for respective allocations may include the same callstack being traced multiple times for different allocations; in at least some different example embodiments, each allocation may be made using a different callstack. Additionally, in at least some example embodiments, tracing may be done on the workstation 156 itself. In at least some other example embodiments, tracing may be done on a testbench setup of significantly smaller scale than the workstation 156. Scaling the workstation 156 down affects the rate of any memory leak, but does not change the allocation size that is the source of the leak, and consequently is possible in conjunction with the allocation sizes identified at block 408. Further, using a testbench allows tracing to be done without risking prejudicing the workstation's 156 operation, as the workstation 156 may still be in a production environment. In the presently described example embodiment, the tracing of block 410 is performed on a testbench and, in view of FIGS. 7A, 7B, 8A, and 8B, callstacks for allocations of sizes 88 and 326 bytes ("traced allocation sizes") are traced.

To perform the tracing of block 410, the heap allocator is hooked to call the computer program code that actually performs the tracing and associated functionality ("tracing code"). Hooking the heap allocator may be done by injecting a DLL different from the one used to walk the memory heap 314; alternatively, hooking the heap allocator may be done using the same DLL as the one used to walk the memory heap 314, but with a different configuration file than the configuration file used when that DLL walked the memory heap 314. By "hook", it is meant that a function call to allocate or deallocate memory (e.g., the malloc( ) and free( ) functions for C++ program code) for one of the respective allocations and deallocations is intercepted, and tracing the callstack is performed in response to the allocation function call and after the allocation function call has been intercepted. In the presently described example embodiment, a single process is traced, and each of the process's threads has a callstack that may make an allocation or deallocation of the traced allocation sizes. In the event the tracing code detects such an allocation, the callstack for that allocation is recorded, and in the event the tracing code detects a corresponding deallocation, the callstack for that allocation is removed. The tracing code outputs the result of its tracing to a mapping file, which is stored in volatile memory and, from time to time, is written to non-volatile storage.

In at least the presently described example embodiment in which the process being traced is expressed using program code in the C++ language, the malloc( ) function is used when allocating memory for an object and the free( ) function is used when deallocating that memory. The data stored in the mapping file that the tracing code outputs comprises, for each allocation, eighteen 64-bit integers. One of those integers is the address of the allocated memory, another of those integers is the size of the allocation, and the remaining sixteen integers are the addresses on the callstack at the time malloc( ) is called. More particularly, they are the last sixteen calls on the callstack immediately preceding the malloc( ) call. While in this example embodiment the last sixteen calls are output to the mapping file, in at least some different example embodiments more or fewer than the last sixteen calls may be output. The file accordingly represents a mapping of addresses to allocation sizes and callstacks; it may, for example, be implemented as an instance of a C++ std::map class.

When called, malloc( ) passes the size of the object for which memory is to be allocated and returns the address of the new allocated memory, and consequently this information is readily available to the tracing code for outputting to the file. The addresses on the callstack are obtained by callstack tracing. When free( ) is called, the address of the object being deallocated is passed to free( ) This address is accordingly available to the tracing code, and the tracing code removes from the file the 18 integers associated with the corresponding allocation entered into the file when free( ) had been called. Consequently, at any given time the file contains a listing of allocations that haven't been freed (i.e., net allocations).

Another parsing script can then be used to search through the callstacks in order of highest to lowest net number of allocations, with a higher number of net allocations indicating a higher likelihood of corresponding to the source of the memory leak. From the callstacks, particular objects that are called and the source code used to call them, and consequently a particular source of the memory leak, can be identified. More particularly, in at least the presently described embodiment a list of all the libraries (e.g., DLLs 310) that are loaded into the process whose allocations and deallocations are being monitored, together with those libraries' base addresses, are dumped to a libraries file. The list of libraries comprises those that are loaded at the time the DLL used to hook the heap allocator is injected into the process that is subject to tracing. The libraries file accordingly contains a list of library base addresses. The mapping file contains a list of addresses on the callstack, and for each of the addresses on the callstack, the library base address in the libraries file that is closest to, and equal to or less than, the callstack address is identified. The offset between the library base address and callstack address is then determined, which corresponds to a specific function call and/or portion of source code. The debugging symbol for the callstack address is then obtained by providing the library name, a list of debugging symbol files and the offset to a debug-symbol function, which facilitates subsequent identification and remediation of the memory leak.

By performing analysis on a per allocation size basis, the method 400 of FIG. 4 permits slowly growing memory leaks to be identified. This is demonstrated in the above described example embodiment of FIGS. 5 to 8B, as FIG. 5 shows that the memory leak caused by problems related to the 88 byte and 326 byte allocation sizes are too small to be noticed when all allocation sizes are considered, but are identifiable in FIGS. 7A and 7B when those particular allocation sizes are considered in isolation. Further, the method 400 not only permits these slowly growing memory leaks to be identified, but also permits in a computationally efficient manner the one or more objects that are the source of the leaks to be identified by performing tracing only for those problematic allocation sizes.

Figure 9:
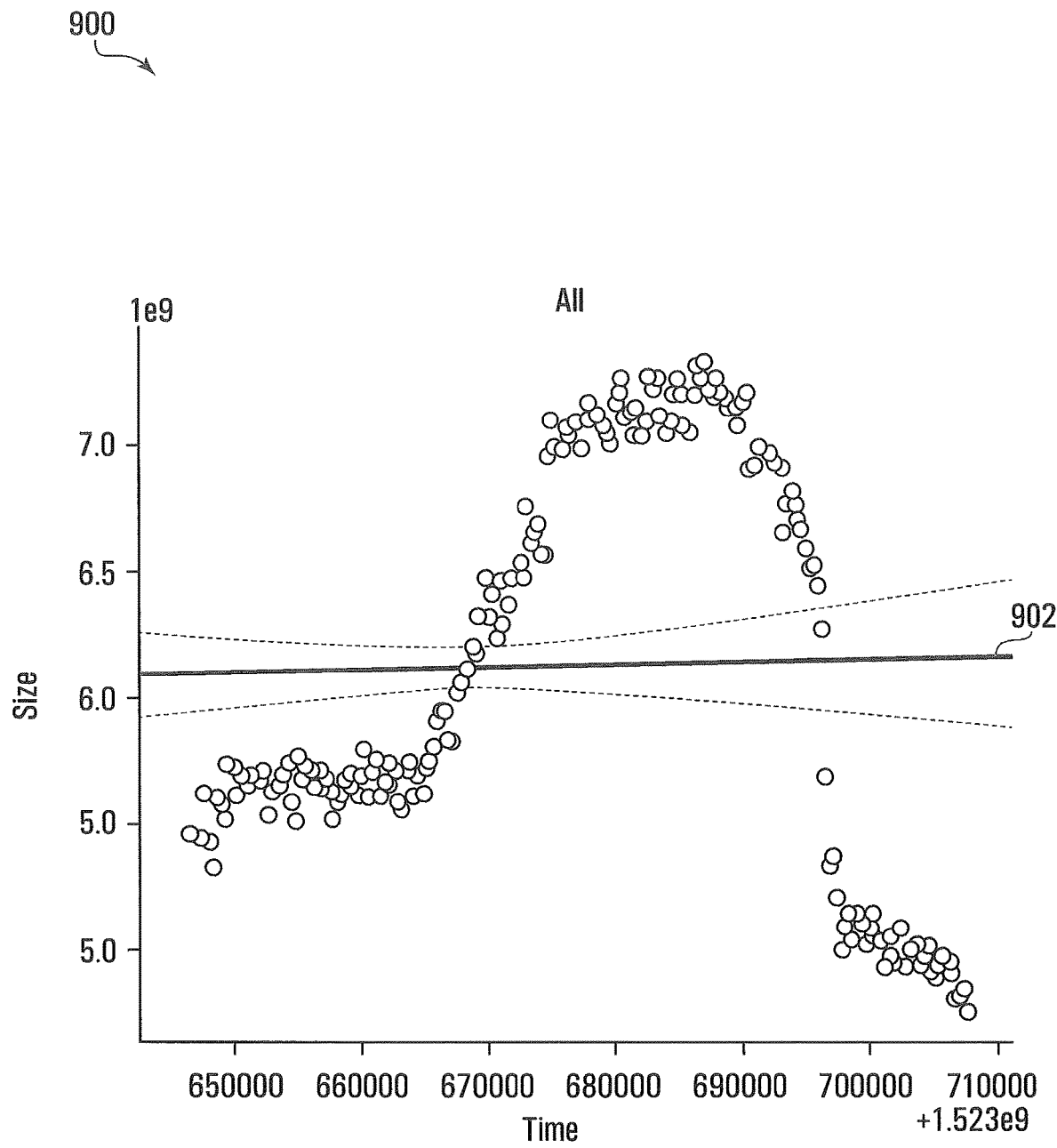
FIG. 9 depicts a graph of total allocated bytes of memory over a time period for the video capture and playback system when it is experiencing a memory leak, according to one example embodiment.
Figure 10:
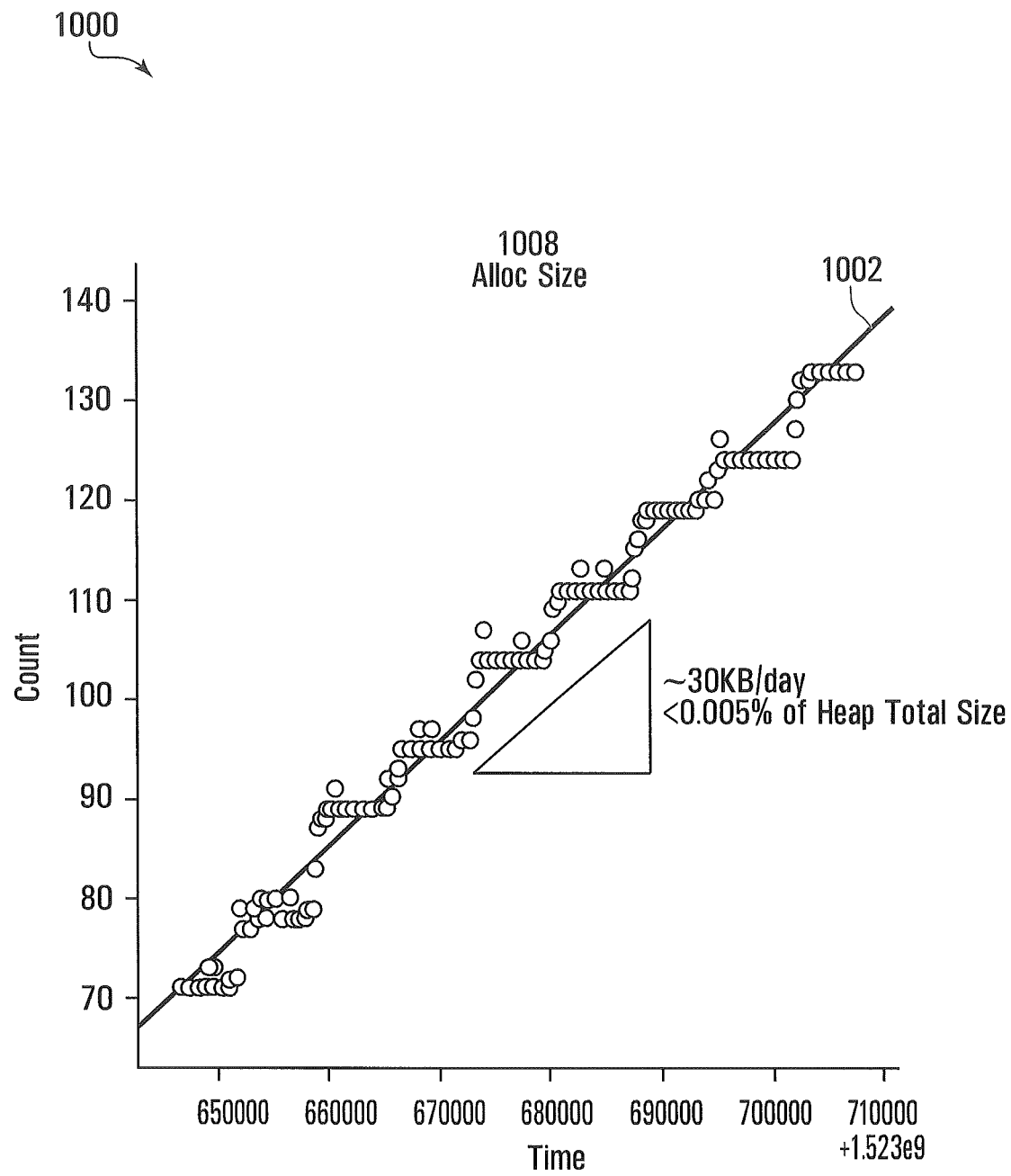
FIG. 10 depicts a graph of allocation counts for a certain allocation size that is indicative of the memory leak that the video capture and playback system of FIG. 9 is experiencing.

The ability of at least some example embodiments to efficiently detect a slowly growing leak is again demonstrated in respect of FIGS. 9 and 10. FIG. 9 depicts a graph 900, analogous to that of FIG. 5, for another example embodiment of the workstation 156 of total allocated bytes of memory over roughly 19 hours when it is experiencing a memory leak. A linear regression of the data points of the graph 900 results in a line 902, which has a slope of approximately zero. Sampling the heap 314 as described above in respect of block 404 allows data to be considered on a per allocation size basis, with FIG. 10 depicting a graph 1000 for an allocation size of 1008 bytes. Performing a linear regression on the data points of the graph 1000 results in a line 1002 having a slope of approximately 30 KB/day, which is less than 0.005% of the total size of the heap 314 in this particular example. Accordingly, the method 400 permits identification of the allocation size that corresponds to the source of this memory leak despite the memory leak growing at a rate that is only a small fraction of the heap's 314 total size.

It is contemplated that any part of any aspect or embodiment discussed in this specification can be implemented or combined with any part of any other aspect or embodiment discussed in this specification.

While the above description provides examples of the embodiments, it will be appreciated that some features and/or functions of the described embodiments are susceptible to modification without departing from the spirit and principles of operation of the described embodiments. Accordingly, what has been described above has been intended to be illustrated non-limiting and it will be understood by persons skilled in the art that other variants and modifications may be made without departing from the scope of the invention as defined in the claims appended hereto.

The invention claimed is:

1. A method comprising:
   determining, by sampling a memory heap at different times, counts of respective allocations of different allocation sizes at the different times;
   from the counts of the respective allocations at the different times, determining rates at which the respective allocations have changed over the different times;
   determining which of the rates is equal to or greater than a leak indication rate; and
   tracing callstacks for the respective allocations of the different allocation sizes for each of the rates that is equal to or greater than the leak indication rate.

2. The method of claim 1, wherein the memory heap is isolated to a process.

3. The method of claim 2, wherein sampling the memory heap comprises injecting a dynamic-link library (DLL) into the process, the DLL comprising computer program code that is executable by a processor running the process and that, when executed, causes the processor to scan the memory heap and output the counts to a sampling file.

4. The method of claim 1, wherein determining the rates at which the respective allocations have changed over the different times comprises, for each of the respective allocations, linearly approximating the counts of the respective allocations by performing a linear regression, and estimating the rate for the respective allocation as a rate at which the counts linearly increase over the different times.

5. The method of claim 1, wherein an entirety of the memory heap is sampled at each of the different times.

6. The method of claim 1 wherein sampling the memory heap is performed on a computing device experiencing a memory leak, and wherein tracing the callstacks is performed on a testbench of smaller scale than the system experiencing the memory leak.

7. The method of claim 1, wherein sampling the memory heap is performed on a computing device experiencing a memory leak, and wherein determining the rates at which the respective allocations have changed over the different times and determining which of the rates is equal to or greater than the leak detection rate is performed using a different computing device.

8. The method of claim 1, further comprising intercepting an allocation function call to allocate memory for one of the respective allocations, and wherein tracing the callstack for the one of the respective allocations is performed in response to the function call and after the intercepting.

9. The method of claim 8, wherein tracing the callstack for the one of the respective allocations comprises obtaining at least some addresses on the callstack, and further comprising in response to the allocation function call and after the intercepting, storing in a mapping file an address of the one of the respective allocations, a size of the one of the respective allocations, and the at least some addresses on the callstack.

10. The method of claim 9, further comprising:
intercepting a deallocation function call to deallocate memory for the one of the respective allocations; and
removing, from the mapping file, the address of the one of the respective allocations, the size of the one of the respective allocations, and the at least some addresses on the callstack.

11. The method of claim 9, further comprising:
ordering callstacks in the mapping file by a net number of allocations; and
searching through the callstacks in the mapping file in order of highest to lowest of the net number of allocations for an object causing a memory leak.

12. The method of claim 11, further comprising:
determining a base address of a library loaded into memory when the tracing is performed;
determining an offset between the base address and one of the addresses on the callstack stored in the mapping file; and
from the base address and the offset, identifying a location in source code corresponding to the object causing the memory leak.

13. The method of claim 12, wherein the base address is nearest to and equal to or less than the one of the addresses on the callstack.

14. A method comprising tracing callstacks for allocations of an allocation size, wherein a rate at which the allocations are changing is equal to or greater than a leak indication rate, and wherein during the tracing, other callstacks for other allocations of another allocation size that are changing at a rate that is less than the leak indication rate are not traced.

15. The method of claim 14, further comprising:
obtaining counts of respective allocations of different allocation sizes at different times, wherein the allocations whose callstacks are traced comprise part of the respective allocations whose counts are obtained; and
from the counts of the respective allocations at the different times, determining that the rate at which the allocations whose callstacks are traced is changing is equal to or greater than the leak indication rate, and that the rate at which the other allocations whose callstacks are not traced is less than the leak indication rate.

16. The method of claim 15, wherein the counts of respective allocations of different allocation sizes at different times comprise histograms of a memory heap at the different times.

17. A non-transitory computer readable medium having stored thereon computer program code that is executable by a processor and that, when executed by the processor, causes the processor to perform a method comprising:
determining, by sampling a memory heap at different times, counts of respective allocations of different allocation sizes at the different times;
from the counts of the respective allocations at the different times, determining rates at which the respective allocations have changed over the different times;
determining which of the rates is equal to or greater than a leak indication rate; and
tracing callstacks for the respective allocations of the different allocation sizes for each of the rates that is equal to or greater than the leak indication rate.

18. A system comprising:
a processor; and
a non-transitory computer readable medium having stored thereon computer program code that is executable by the processor and that, when executed by the processor, causes the processor to perform a method comprising:
determining, by sampling a memory heap at different times, counts of respective allocations of different allocation sizes at the different times;
from the counts of the respective allocations at the different times, determining rates at which the respective allocations have changed over the different times;
determining which of the rates is equal to or greater than a leak indication rate; and
tracing callstacks for the respective allocations of the different allocation sizes for each of the rates that is equal to or greater than the leak indication rate.

* * * * *